(12) United States Patent  
Iwamatsu et al.

(10) Patent No.: US 7,116,999 B2
(45) Date of Patent: Oct. 3, 2006

(54) MOBILE COMMUNICATIONS RECEIVING APPARATUS AND METHOD

(75) Inventors: Takanori Iwamatsu, Kawasaki (JP); Masayuki Sutoh, Kawasaki (JP); Yasuharu Amezawa, Kawasaki (JP); Shinichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 441 days.

(21) Appl. No.: 10/115,470

(22) Filed: Apr. 3, 2002

(65) Prior Publication Data

US 2003/0045313 A1    Mar. 6, 2003

(30) Foreign Application Priority Data

Aug. 27, 2001  (JP)  ............... 2001-255889

(51) Int. Cl.
  *H04B 7/00*  (2006.01)

(52) U.S. Cl. .............. 455/513; 455/13.4; 370/332
(58) Field of Classification Search ............ 455/513, 455/13.4, 65, 67.1, 506, 526, 67.13, 135, 455/137, 451, 441, 104, 10; 375/148, 150; 370/335, 331, 206
See application file for complete search history.

(56) References Cited

U.S. PATENT DOCUMENTS

| | | | |
|---|---|---|---|
| 4,561,074 A * | 12/1985 | Warmack | 367/46 |
| 5,910,948 A * | 6/1999 | Shou et al. | 370/335 |
| 6,011,970 A * | 1/2000 | McCarthy | 455/436 |
| 6,044,083 A * | 3/2000 | Citta et al. | 370/441 |
| 6,272,258 B1 * | 8/2001 | Dickopp et al. | 382/249 |
| 6,684,233 B1 * | 1/2004 | Koike | 708/322 |
| 6,707,844 B1 * | 3/2004 | Imaizumi et al. | 375/148 |
| 6,970,605 B1 * | 11/2005 | Kondo et al. | 382/254 |
| 2003/0012267 A1 * | 1/2003 | Jitsukawa et al. | 375/148 |
| 2003/0026283 A1 * | 2/2003 | Currivan et al. | 370/441 |
| 2003/0035468 A1 * | 2/2003 | Corbaton et al. | 375/148 |
| 2003/0064729 A1 * | 4/2003 | Yamashita | 455/451 |
| 2003/0157892 A1 * | 8/2003 | Reznik et al. | 455/65 |

FOREIGN PATENT DOCUMENTS

| | | |
|---|---|---|
| JP | 63-272126 | 11/1988 |
| JP | 64-18339 | 1/1989 |
| JP | 64-50629 | 2/1989 |
| JP | 10-224281 | 8/1998 |
| WO | WO97/20400 | 6/1997 |

* cited by examiner

*Primary Examiner*—Matthew D. Anderson
*Assistant Examiner*—Tan Trinh
(74) *Attorney, Agent, or Firm*—Katten Muchin Rosenman LLP

(57) ABSTRACT

In a mobile communication receiving apparatus in which signals received on a plurality of receiving paths (branches) are combined by a combiner, correlation between noise signals contained in the signals received on respective ones of the branches is detected by a noise correlation calculating unit, and control is exercised so as to maximize signal-to-noise power ratio of the combined signal based upon the correlation calculated in the noise correlation calculating unit. Signal-to-noise power ratio can be maximized even if noise components contained in respective ones of the branch signals are mutually correlated.

11 Claims, 9 Drawing Sheets

MOBILE COMMUNICATIONS RECEIVING APPARATUS AND METHOD

BACKGROUND OF THE INVENTION

This invention relates to a mobile communications receiving apparatus and method. More particularly, the invention relates to a mobile communications receiving apparatus and method for combining and receiving signals that have been received on a plurality of receiving branches.

A diversity combining reception method described in, e.g., "Demodulation of Digital Wireless Communications" by Yoichi Saito, published by the Electronic Information Communications Society (a corporate juridical person), First Edition, Third Printing, Sep. 1, 1997, pp. 189–191, is known as a technique involving a diversity combining receiver circuit in a mobile communications system.

Figure 11:
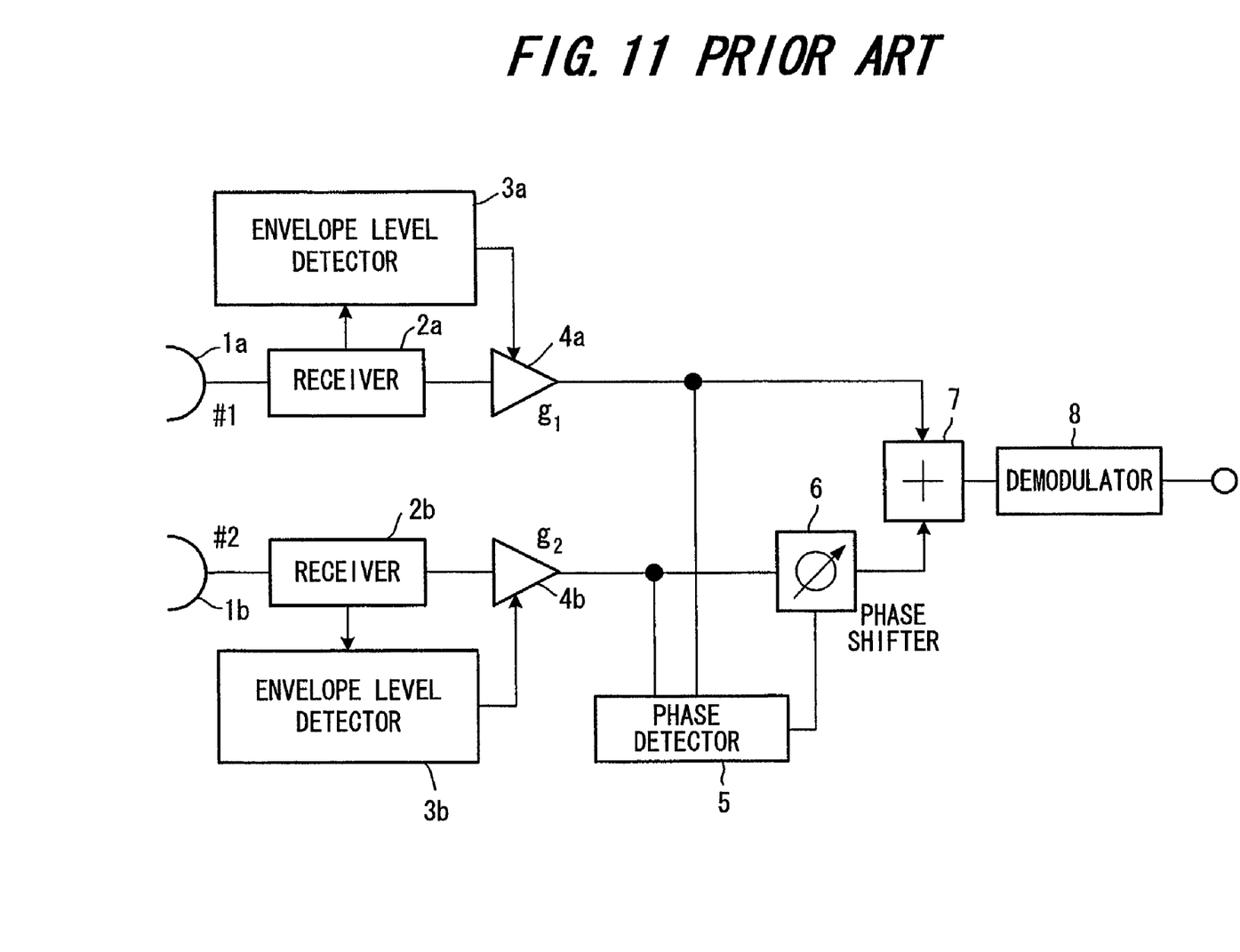
FIG. 11 is a diagram useful in describing the maximum ratio combining method according to the prior art.

In the reference mentioned above, the maximum ratio combining method is indicated as one method of diversity combining reception. According to the maximum ratio combining method, signals that have been received on a plurality of receiving paths (branches) are combined upon being weighted by the respective envelope levels (amplitude levels). FIG. 11 is a diagram useful in describing the maximum ratio combining method. Here a first receiving path (first branch) is formed by an antenna $1a$ and a receiver $2a$, an envelope level detector $3a$ detects the envelope of the receive signal in the first branch and a gain varying unit $4a$ multiplies the receive signal by a gain $g_1$, which conforms to the envelope level, and outputs the resultant signal. A second receiving path (second branch) is formed by a directional antenna $1b$ and a receiver $2b$, an envelope level detector $3b$ detects the envelope of the receive signal in the second branch and a gain varying unit $4b$ multiplies the receive signal by a gain $g_2$, which conforms to the envelope level, and outputs the resultant signal. A phase detector 5 detects the phase difference between the receive signals in the first and second branches, a phase shifter 6 shifts the phase of the receive signal in the second branch by an amount equivalent to the phase difference to thereby match the phases of the receive signals of the two branches, a combiner 7 combines the receive signals of the two branches weighted by the envelope levels, and a demodulator 8 demodulates the transmit data based upon the combined signal.

The maximum ratio combining method which, under certain conditions, maximizes SNR (Signal-to-noise power ratio) after the signals are combined, is in widespread use.

However, the maximum ratio combining method is the optimum combining method on the assumption that noise components contained in the receive signals of the respective branches have no mutual correlation. Accordingly, the maximum ratio combining method is not necessarily the best combining method in circumstances where it cannot be assumed that the noise components contained in the receive signals (referred to also as "branch signals" below) of each branch are not mutually correlated. It is possible that using this method to combine signals may worsen characteristics rather than improve them.

SUMMARY OF THE INVENTION

Accordingly, an object of the present invention is to provide a mobile communications receiving apparatus and method for solving the above-mentioned problem with the maximum ratio combining method, namely the fact that characteristics may be worsened rather than improved by combining receive signals in circumstances where it cannot be assumed that noise components contained in respective branch signals are not mutually correlated.

Another object of the present invention is to provide a mobile communications receiving apparatus and method in which SNR can be maximized even if noise components contained in respective branch signals are mutually correlated.

According to a first aspect of the present invention, the foregoing objects are attained by providing a mobile communications receiving apparatus for combining and receiving signals that have been received on a plurality of receiving paths, the apparatus calculating the correlation between noise signals contained in the signals received on the respective receiving paths and exercising control using the calculated correlation so as to maximize SNR of the combined signal.

According to a second aspect of the present invention, the foregoing objects are attained by providing a mobile communications receiving apparatus for combining and receiving signals that have been received on a plurality of receiving paths, the apparatus expressing the SNR of the combined signal using weighting coefficients applied to the receive signals, calculating optimum weighting coefficient values for which an amount of change in SNR with respect to a minute change in the weighting coefficients becomes zero, and controlling the SNR of the combined signal by applying the optimum weighting coefficient values to the receive signals.

According to a third aspect of the present invention, the foregoing objects are attained by providing a mobile communications receiving apparatus for combining and receiving signals that have been received on a plurality of receiving paths, the apparatus expressing the SNR of the combined signal using weighting coefficients applied to the receive signals, repeating processing for calculating SNR while changing the weighting coefficient values, calculating optimum weighting coefficient values for which the SNR is maximized, and controlling the SNR of the combined signal by applying the optimum weighting coefficient values to the receive signals.

According to a fourth aspect of the present invention, the foregoing objects are attained by providing a mobile communications receiving apparatus comprising: (1) desired signal detecting means, provided in association with respective ones of a plurality of receive signals received on a plurality of receiving paths, for detecting amplitude information of desired signals; (2) noise signal detecting means, provided in association with respective ones of the receive signals, for detecting noise signals; (3) noise average power detecting means, provided in association with respective ones of the receive signals, for detecting average power of the noise signals detected by the noise signal detecting means; (4) noise correlation detecting means for detecting cross-correlation of the noise signals with regard to all combinations of the plurality of noise signals detected by the plurality of noise signal detecting means; (5) weighting coefficient calculating means for calculating weighting coefficients based upon the amplitude information of the desired signals detected by respective ones of the desired signal detecting means, the noise average power detected by respective ones of the noise average power detecting means and the noise-signal cross-correlation detected by the noise correlation detecting means; (6) weighting means for multiplying the receive signals by corresponding ones of the weighting coefficients calculated by the weighting-coefficient calculating means; and (7) combining means for adding and combining outputs from all of the weighting means.

The noise correlation detecting means calculates the cross-correlation between the noise signal of a prescribed receiving path 1 and the noise signal of another receiving path 2 by way of (1) to (5) below. Specifically, letting X1 represent an in-phase component of noise of the receiving path 1, X2 an in-phase component of noise of the receiving path 2, Y1 a quadrature component of noise of the receiving path 1 and Y2 a quadrature component of noise of the receiving path 2, cross-correlation between noise signals is calculated by (1) adding the product of Y1 and Y2 to the product of X1 and X2 and obtaining an expected value of the sum; (2) multiplying the expected value by the cosine value of the difference between a desired-signal phase of the receiving path 2 and a desired-signal phase of the receiving path 1; (3) subtracting the product of X1 and Y2 from the product of X2 and Y1 and obtaining an expected value of the difference; (4) multiplying the expected value by the sine value of the difference between the desired-signal phase of the receiving path 2 and the desired-signal phase of the receiving path 1; and (5) summing the products.

Further, if there have been found a plurality of sets of weighting coefficients of each of the receiving paths for which an amount of change in signal-to-noise power ratio with respect to a minute change in the weighting coefficients becomes zero, then, when the desired signal amplitudes of the respective receiving paths have been added upon being weighted by the corresponding weighting coefficients set by set, the weighting coefficient calculating means outputs a set of the weighting coefficients for which the sum will be a positive value.

Other features and advantages of the present invention will be apparent from the following description taken in conjunction with the accompanying drawings.

DESCRIPTION OF THE PREFERRED EMBODIMENT (A) Fundamental Principles

Maximum ratio combining according to the prior art introduces the supposition that noise components contained in branch signals are not mutually correlated, i.e., that the correlation between the signals is zero. This means that conventional maximum ratio combining is inappropriate when noise components contained in branch signals exhibit cross-correlation. Accordingly, the present invention is so adapted as to find weighting coefficients, which are used when signals are combined, such that SNR after signals are combined will be maximized even if the correlation between noise components contained in branch signals is not zero. As a result, suitable diversity combining can be achieved without worsening characteristics, as occurs when signals are combined in accordance with conventional maximum ratio combining, even if noise components contained in the receive signals on respective receiving paths exhibit cross-correlation.

The fundamental principles of this embodiment will now be described.

In general, two branch signals are represented by Equations (1) and (2) below.

$$R_1 = A_1 s + B_1 w_1 \quad (1)$$

$$R_2 = A_2 s + B_2 w_2 \quad (2)$$

where s represents a desired signal (unit vector), and $w_1$, $w_2$ represent noise (unit vectors) of branches 1, 2. It is assumed that the following holds: $Ex[s^2]=Ex[w_1^2]=Ex[w_2^2]=1$ (where Ex[ ] represents an expected value over an observation interval). Further, $A_1$, $B_1$, $A_2$, $B_2$ represent the amplitudes of the desired signals and noise on branches 1 and 2.

Even if the issue of the diversity combining of the two branch signals $R_1$ and $R_2$ is replaced by the issue of the combining of $r_1$ and $r_2$ defined by Equations (3) and (4) below, there will be no loss in generality. Accordingly, $R_1$ and $R_2$ will be considered to be $r_1$ and $r_2$, respectively, below.

$$r_1 = R_1/A_1 = s + M_1 w_1 \quad (3)$$

$$r_2 = R_2/A_2 = s + M_2 w_2 \quad (4)$$

where $M_1 = B_1/A_1$, $M_2 = B_2/A_2$.

We find an optimum value $K^{(op)}$ of a coefficient K that will maximize the SNR (signal-to-noise power ratio) γ of a signal $R_c$, which is obtained by combining $r_1$ and $r_2$, represented by Equation (5) below. The SNR γ of the combined signal $R_c$ is expressed by Equation (6) below, where $N_{12}=Ex[w_1 w_2]$.

$$R_c = (1/A_1)R_1 + (K/A_2)R_2 = r_1 + Kr_2 \quad (5)$$

$$\gamma = (1+K)^2 Ex[s^2]/Ex[(M_1 w_1 + KM_2 w_2)^2]$$
$$= (1+K)^2 Ex[s^2]/\{M_1^2 Ex[w_1^2] + K^2 M_2^2 Ex[w_2^2] + 2KM_1 M_2 Ex[w_1 w_2]\}$$

$$= (1+K)^2/(M_1^2 + K^2 M_2^2 + 2KM_1 M_2 N_{12}) \quad (6)$$

Figure 1:
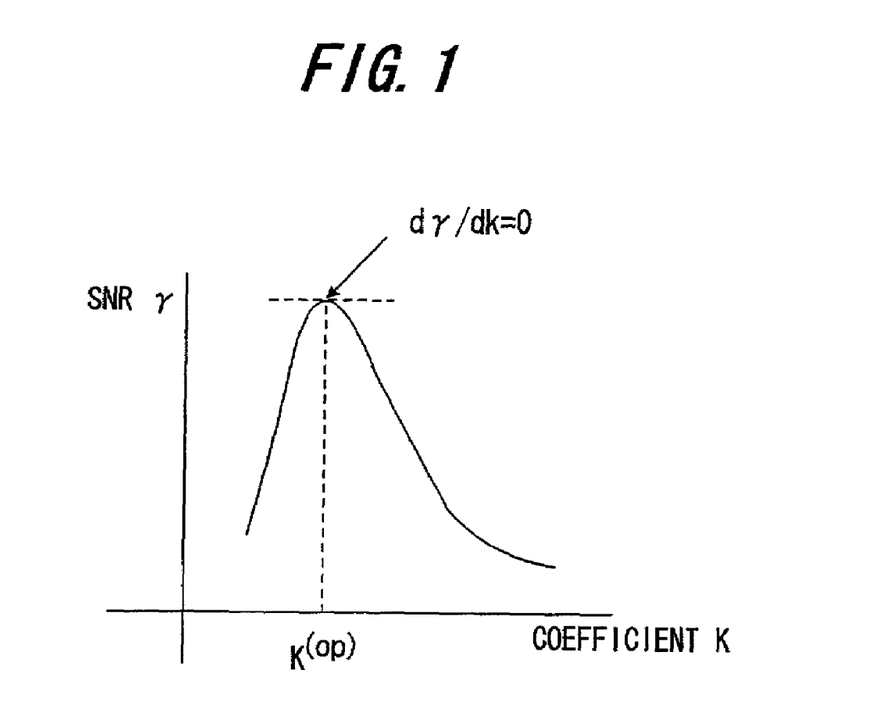
FIG. 1 is a diagram (a characteristic diagram of the relationship between SNR and a weighting coefficient) useful in describing the fundamental principles of the present invention.

The relationship between SNR γ and the weighting coefficient K is as illustrated in FIG. 1. The optimum value $K^{(op)}$ that provides the maximum value of SNR γ is obtained from Equation (8) by solving Equation (7) below based upon the maximal conditions.

$$d\gamma/dK=0 \qquad (7)$$

$$K^{(op)}=(M_1^2-M_1M_2N_{12})/(M_2^2-M_1M_2N_{12}) \qquad (8)$$

Equation (8) is derived as shown below. Specifically, if Equation (6) is differentiated with respect to K, Equation (7a) is obtained.

$$d\gamma/dK = \{2(1+K)(M_1^2+K^2M_2^2+2kM_1M_2N_{12}- \qquad (7a)$$
$$(1+K)^2(2KM_2^2+2M_1M_2N_{12})\}/$$
$$(M_1^2+K^2M_2^2+2KM_1M_2N_{12})^2$$
$$= 2(1+K)\{(M_1M_2N_{12}-M_2^2)K+M_1^2-M_1M_2N_{12}\}/$$
$$(M_1^2+K^2M_2^2+2KM_1M_2N_{12})^2$$

Though there are two solutions that provide $d\gamma/dK=0$, namely $K=-1$ and $K=(M_1^2-M_1M_2N_{12})(M_2^2-M_1M_2N_{12})$, $\gamma=0$ holds in case of $K=-1$ and is the solution that gives the minimum value. The other solution, therefore, namely $$K=(M_1^2-M_1M_2N_{12})/(M_2^2-M_1M_2N_{12})$$

is the optimum value $K^{(op)}$ that gives the maximum value of SNR $\gamma$.

The combined signal when $K=K^{(op)}$ holds is $r_1+K^{(op)}r_2$, and SNR $\gamma_{(2)}^{(op)}$ becomes $$\gamma_{(2)}^{(op)}=(1+K^{(op)})^2/(M_1^2+K^{(op)2}M_2^2+2K^{(op)}M_1M_2N_{12}) \qquad (9)$$

From Equation (8), the weighting ratio of branches 1, 2 becomes $$1:K^{(op)}=1/(M_1^2-M_1M_2N_{12}):1/(M_2^2-M_1M_2N_{12}) \qquad (10)$$

The combined signal Rc becomes as follows in accordance with Equations (3), (4):

$$(s+M_1w_1)/(M_1^2-M_1M_2N_{12})+(s+M_2w_2)/(M_2^2-M_1M_2N_{12}) \qquad (11)$$

If the relationships $M_1=B_1/A_1$, $M_2=B_2/A_2$ are substituted into Equation (11), then the combined signal Rc will be expressed as follows:

$$A_1/\{B_1^2-(A_1/A_2)B_1B_2N_{12}\}\times(A_1s+B_1w_1)+A_2/\{B_2^2-(A_2/A_1)B_1B_2N_{12}\}\times(A_2s+B_2w_2) \qquad (12)$$

In other words, weighting coefficients $G_1$, $G_2$ of the combination with respect to the two branch signals $A_1s+B_1w_1$ and $A_2s+B_2w_2$ are as follows:

$$G_1=A_1/\{B_1^2-(A_1/A_2)B_1B_2N_{12}\} \qquad (13)$$

$$G_2=A_2/\{B_2^2-(A_2/A_1)B_1B_2N_{12}\} \qquad (14)$$

In Equations (13), (14), $A_1$, $A_2$ represent the signal amplitudes of the branches 1, 2, respectively, $B_1^2$, $B_2^2$ the noise powers of the branches 1, 2, respectively, and $B_1B_2N_{12}$ the cross-correlation between the noise signals of branches 1 and 2. All of these are measurable parameters.

(B) Elaboration of Fundamental Principles (a) Deciding Weighting Coefficients

Weighting coefficients are sought in such a manner that the SNR will take on a maximum value. That is, weighting coefficients are sought using the ratio of signal-component power to noise-component power as an evaluation function. This means that the set $(-G_1, -G_2)$ obtained by changing the signs of the solutions found from Equations (13), (14) also can be a solution. When either the set $(G_1, G_2)$ or the set $(-G_1, -G_2)$ is decided upon as the final set of weighting coefficients, it is necessary to select the set of weighting coefficients that will not change the sign of the signal component after signals are combined (after signals are weighted and then added). The reason is that if the sign of the signal component were to change owing to the combining of signals, digital data 0, 1 would be discriminated erroneously. In other words, the set $(-G_1, -G_2)$ is selected if $G_1A_1+G_2A_2$ is positive. If $G_1A_1+G_2A_2$ is negative, then the set $(-G_1, -G_2)$ is selected so that the combined signal will be rendered positive. The selected coefficients are adopted as the final weighting coefficients.

(b) Application of Present Invention to Three Branches

The fundamental principles outlined above were described in the case of two branches. A situation where three or more branch signals are combined will now be described.

A combined signal $Rc^{(op)}$ obtained by combining two branch signals is as indicated by Equation (15) below based upon the fundamental principles described above.

$$Rc^{(op)} = r_1 + K^{(op)}r_2 \qquad (15)$$
$$= (1+K^{(op)})s + M_1w_1 + K^{(op)}M_2w_2$$

The combining of three branch signals can be considered to involve the combining of a branch signal represented by Equation (16) below with the optimum combined signal of two branch signals represented by Equation (15).

$$R_3=A_3s+B_3w_3 \qquad (16)$$

where $w_3$ represents the noise in branch 3. It is assumed that $Ex[w_3^2]=1$ holds. Further, $A_3$, $B_3$ are the amplitudes of the desired signal and noise, respectively, on branch 3.

Even if the issue of the diversity combining of $Rc^{(op)}$ and $R_3$ is replaced by the issue of the combining of $r_c$ and $r_3$ defined by Equations (17) and (18) below, there will be no loss in generality, in a manner similar to that set forth in the description of fundamental principles. Accordingly, $Rc^{(op)}$ and $R_3$ will be considered to be $r_c$ and $r_3$, respectively, below.

$$r_c = R_c^{(op)}/(1+K^{(op)}) \qquad (17)$$
$$= s + [M_1/(1+K^{(op)})]w_1 + [K^{(op)}M_2/(1+K^{(op)})]w_2$$
$$= s + M_cw_c$$

$$r_3=s+M_3w_3 \qquad (18)$$

where $M_3=B_3/A_3$. Further, we have the following relations:

$$M_c^2=1/\gamma_{(2)}^{(op)} \qquad (19)$$

$$M_cw_c=[M_1/(1+K^{(op)})]w_1+[K^{(op)}M_2/(1+K^{(op)})]w2 \qquad (20)$$

In a manner similar to that set forth in the fundamental principles, an optimum value $L^{(op)}$ of a coefficient L that will maximize the SNR $\gamma$ of a combined signal $r_c+Lr_3$ obtained by combining $r_c$ and $r_3$ is obtained by the following:

$$L^{(op)}=(M_c^2-M_cM_3N_{c3})/(M_3^2-M_cM_3N_{c3}) \qquad (21)$$

Since $N_{c3}=Ex[w_c w_3]$ holds, we have $$M_c M_3 N_{c3} = Ex[M_c w_c M_3 w_3] \quad (22)$$
$$= Ex[\{(M_1/(1+K^{(op)}))w_1 + K^{(op)}$$
$$(M_2/(1+K^{(op)}))w_2\}M_3 w_3]$$
$$= M_1 M_3 N_{13}/(1+K^{(op)}) +$$
$$K^{(op)} M_2 M_3 N_{23}/(1+K^{(op)})$$

where $N_{13}=Ex[w_1 w_3]$, $N_{23}=Ex[w_2 w_3]$.

The optimum combined signal at this time is $$r_c + L^{(op)} r_3 = R_c^{(op)}/(1+K^{(op)}) + L^{(op)} r_3 \quad (23)$$
$$= (r_1 + K^{(op)} r_2)/(1+K^{(op)}) + L^{(op)} r_3$$
$$= \{1/A_1(1+K^{(op)})\} \times R_1 +$$
$$\{K^{(op)}/A_2(1+K^{(op)})\}R_2 + \{L^{(op)}/A_3\} \times R_3$$

Further, as in Equation (9), SNR $\gamma_{(3)}^{(op)}$ is written as follows:

$$\gamma_{(3)}^{(op)} = (1+L^{(op)})^2/(M_c^2 + L^{(op)2}M_3^2 + 2L^{(op)}M_c M_3 N_{c3}) \quad (24)$$

From Equation (23), weighting coefficients $G_1$, $G_2$, $G_3$ corresponding to the three branch signals $R_1$, $R_2$, $R_3$, respectively, are as follows:

$$G_1 = 1/A_1(1+K^{(op)}) \quad (25)$$

$$G_2 = K^{(op)}/A_2(1+K^{(op)}) \quad (26)$$

$$G_3 = L^{(op)}/A_3 \quad (27)$$

Weighting coefficients in case of four or more branches can be obtained in similar fashion by repeating the approach described above.

(c) In Case of Complex Notation

The noise components $w_1$, $w_2$ in Equations (1), (2) comprise an in-phase component (I component) and a quadrature component (Q component). Here the results of the section pertaining to fundamental principles will be described supplementarily from the viewpoint of the I, Q components. In general, the I, Q components are denoted by a complex number in which the I component is the real part and the Q component the imaginary part. Accordingly, the description rendered below also will make use of complex notation.

Since $w_1$, $w_2$ are complex numbers, the denominator (noise power) in Equation (6) becomes as shown in Equation (28) below, where * represents a complex conjugate. If a signal is expressed by a complex number A, the signal power is expressed as the product between the complex number A and its complex conjugate A*.

$$\begin{aligned} Ex[(M_1 w_1 + KM_2 w_2) \\ (M_1 w_1 + KM_2 w_2)^*] \end{aligned} = Ex[(M_1 w_1 + KM_2 w_2) \quad (28)$$
$$(M_1 w_1^* + KM_2 w_2^*)]$$
$$= M_1^2 Ex[w_1 w_1^*] + K^2 M_2^2 Ex[w_2 w_2^*] +$$
$$KM_1 M_2 Ex[w_1^* w_2 + w_1 w_2^*]$$
$$= M_1^2 + K^2 M_2^2 + 2KM_1 M_2 N_{12}'$$

Here we have $$N_{12}' = EX[w_1^* w_2 + w_1 w_2^*]/2 \quad (29)$$

That is, it will be understood from the contrast between the denominator of Equation (6) and Equation (28) that it will suffice if $N_{12}$ in the results set forth in the description of fundamental principles is replaced by $N_{12}'$.

Furthermore, if $$w_1 = x_1 + jy_1 \quad (30)$$

$$w_2 = x_2 + jy_2 \quad (31)$$

hold in Equation (29) (where j is the complex number of $j^2=-1$), then the fact that the following holds is readily derived:

$$w_1^* w_2 + w_1 w_2^* = 2(x_1 x_2 + y_1 y_2) \quad (32)$$

(d) Phase Correction

Figure 2:
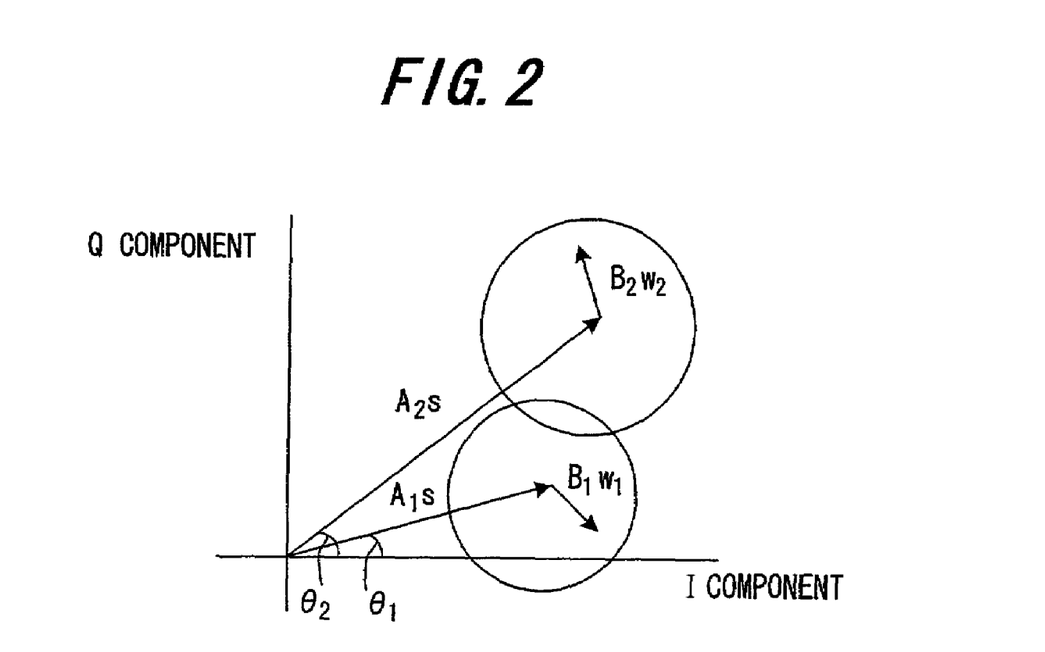
FIG. 2 is a diagram useful in describing control for correcting phase rotation caused by propagation.

When radio waves propagate in the case of mobile communications, phase rotation occurs owing to the characteristics of the propagation path. More specifically, even though the signal on the I-component axis (Q component=0) is transmitted, the receive signals on branches 1 and 2 are received after their phases have been rotated by $\theta_1$ and $\theta_2$, respectively, as illustrated in FIG. 2. In a situation where diversity combining is carried out, it is necessary to detect the amounts of phase rotation $\theta_1$, $\theta_2$ through some method, apply rotation in the opposite direction by equivalent amounts of phase rotation to match the phases of the receive signals on the two branches, and then combine the signals.

Here reference will be had to FIG. 2 to describe the relationship between the cross-correlation of noise before phase rotation of radio-wave propagation is corrected and the cross-correlation of noise after the correction is made.

When a correction is made by applying rotation in the reverse direction by phase-rotation amounts $\theta_1$, $\theta_2$ obtained by detecting the receive signals of branches 1, 2 in FIG. 2 through some method, the noise components $w_1$, $w_2$ also are rotated by $\theta_1$, $\theta_2$, respectively, and $w_1'$, $w_2'$ in Equations (33), (34) are obtained.

$$w_1' = w_1(\cos\theta_1 - j\sin\theta_1) = (x_1+jy_1)(\cos\theta_1 - j\sin\theta_1) \quad (33)$$

$$w_2' = w_2(\cos\theta_2 - j\sin\theta_2) = (x_2+jy_2)(\cos\theta_2 - j\sin\theta_2) \quad (34)$$

The cross-correlation between $w_1'$ and $w_2'$ is obtained by $Ex[w_1'^* w_2' + w_1' w_2'^*]/2$ in a manner similar to that of Equation (29). Furthermore, the fact that the terms within the expected-value operation $Ex[\ ]$ in this equation are as follows may readily be derived:

$$w_1'^* w_2' + w_1' w_2'^* = 2(x_1 x_2 + y_1 y_2)\cos(\theta_1-\theta_2) + 2(x_2 y_1 - x_1 y_2)\sin(\theta_1-\theta_2) \quad (35)$$

That is, if the expected values of $x_1 x_2 + y_1 y_2$ and $x_2 y_1 - x_1 y_2$ are found before the phase correction, the cross-correlation after the phase correction can be obtained from Equation (35).

(C) Structure of Mobile Communication Receiving Apparatus of This Invention

Figure 3:
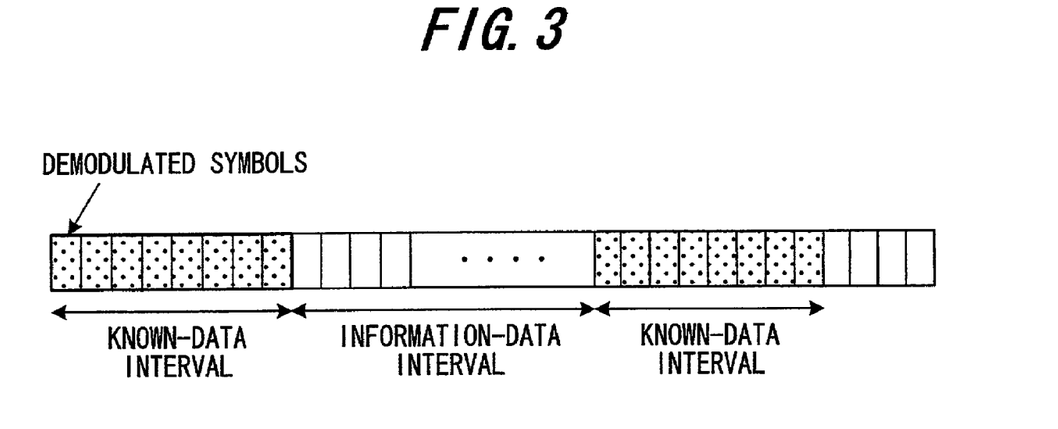
FIG. 3 is a diagram useful in describing intervals of known data and information data constituting transmit data in a mobile communications system according to the present invention.

An embodiment of the present invention will now be described in detail with reference to the drawings. It should be noted that this is a case where the mobile communication receiving apparatus of this embodiment is applied to a mobile communications system in which known data (a pilot, etc.) of a predetermined duration is transmitted upon being inserted at predetermined time intervals between items of transmitted information data (user data) on the transmitting side, as shown in FIG. 3.

(a) Overall Structure

Figure 4:
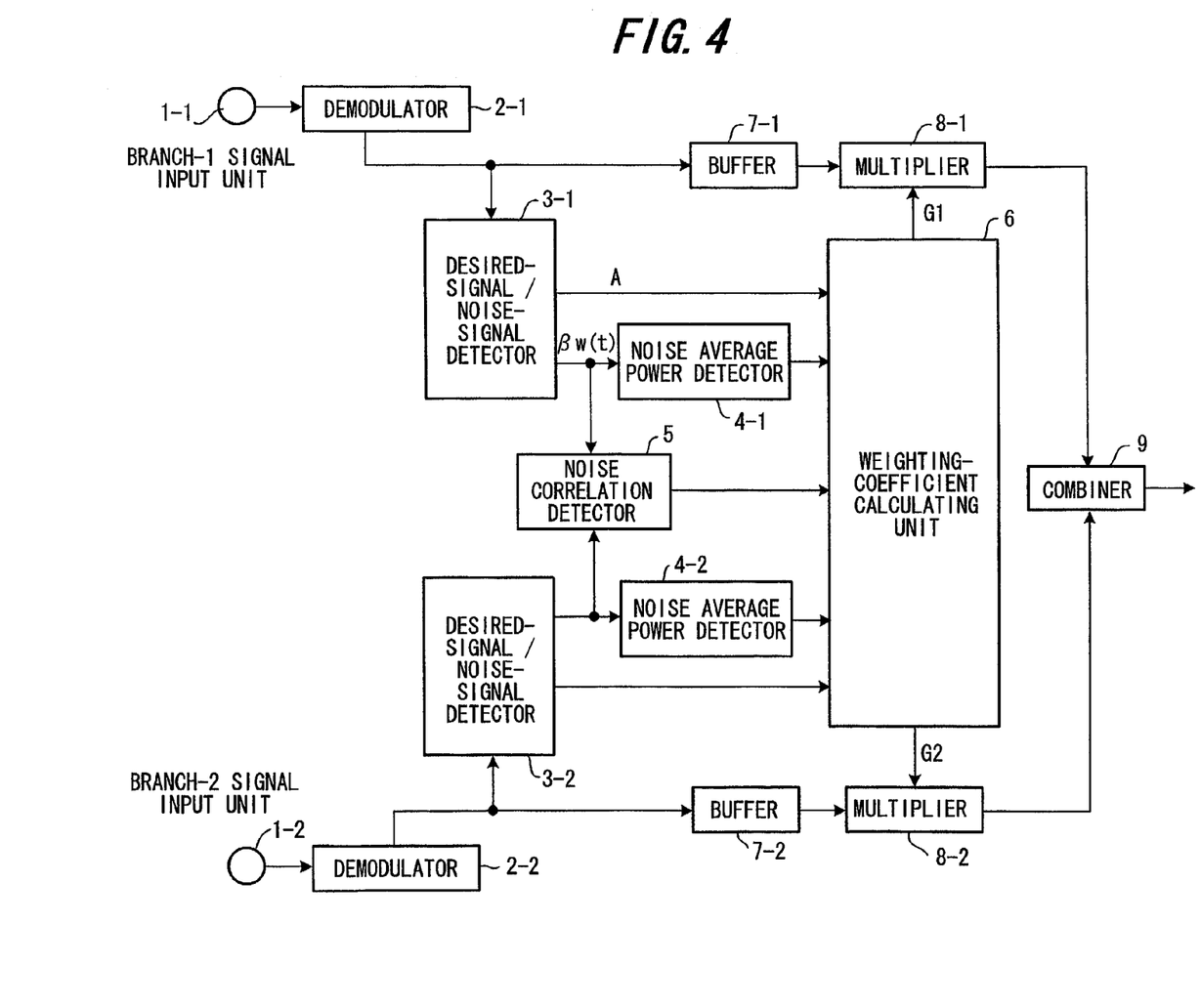
FIG. 4 is a block diagram of a mobile communications receiving apparatus according to the present invention.

FIG. 4 is a block diagram of a mobile communications receiving apparatus according to the present invention. Here the apparatus has a structure for two-branch diversity combining.

A receive signal that has entered from a signal input unit 1-1 on branch 1 is applied to a demodulator 2-1. The demodulator 2-1 executes demodulation processing and outputs the demodulated signal to a desired-signal/noise-signal detector 3-1 and to a queuing buffer 7-1. The desired-signal/noise-signal detector 3-1 detects an envelope (time-series amplitude information) of the desired signal and noise from the demodulated signal that is the output of the demodulator 2-1, and outputs the envelope of the desired signal to a weighting coefficient calculating unit 6 and the noise signals to a noise average power detector 4-1 and noise correlation detector 5. The noise average power detector 4-1 detects noise average power from the noise signals that are the output of the desired-signal/noise-signal detector 3-1 and outputs the detected noise average power to the weighting-coefficient calculating unit 6.

Similarly, a receive signal that has entered from a signal input unit 1-2 on branch 2 is applied to a demodulator 2-2. The demodulator 2-2 executes demodulation processing and outputs the demodulated signal to a desired-signal/noise-signal detector 3-2 and to a queuing buffer 7-2. The desired-signal/noise-signal detector 3-2 detects an envelope of the desired signal and noise from the demodulated signal that is the output of the demodulator 2-2, and outputs the envelope of the desired signal to the weighting coefficient calculating unit 6 and the noise signals to a noise average power detector 4-2 and the noise correlation detector 5. The noise average power detector 4-2 detects noise average power from the noise signals that are the output of the desired-signal/noise-signal detector 3-2 and outputs the detected noise average power to the weighting-coefficient calculating unit 6.

The noise correlation detector 5 detects correlation between the noise signals on branches 1 and 2 from the noise signals on branch 1, which are the outputs of the desired-signal/noise-signal detector 3-1, and the noise signals on branch 2, which are the outputs of the desired-signal/noise-signal detector 3-2 and outputs the detected correlation between the noise signals to the weighting-coefficient calculating unit 6.

The buffer 7-1 outputs the demodulated signal, which is the output of the demodulator 2-1, to a multiplier 8-1 upon delaying the signal a predetermined length of time. The buffer 7-2 outputs the demodulated signal, which is the output of the demodulator 2-2, to a multiplier 8-2 upon delaying the signal a predetermined length of time.

The weighting-coefficient calculating unit 6 calculates weighting coefficient $G_1$ of branch 1 and weighting coefficient $G_2$ of branch 2 in accordance with Equations (13) and (14), respectively, from the envelope of the desired signal on branch 1 output by the desired-signal/noise-signal detector 3-1, the envelope of the desired signal on branch 2 output by the desired-signal/noise-signal detector 3-2, the noise average power on branch 1 output by the noise average power detector 4-1, the noise average power on branch 2 output by the noise average power detector 4-2, and the noise correlation between branches 1 and 2 output by the noise correlation detector 5, outputs the weighting coefficient $G_1$ of branch 1 to the multiplier 8-1 and outputs the weighting coefficient $G_2$ of branch 2 to the multiplier 8-2.

The multiplier 8-1 multiplies the demodulated signal output from the buffer 7-1 by the weighting coefficient $G_1$ of branch 1 and outputs the product to a combiner 9. The multiplier 8-2 multiplies the demodulated signal output from the buffer 7-2 by the weighting coefficient $G_2$ of branch 2 and outputs the product to the combiner 9. The combiner 9 adds the outputs of the multipliers 8-1 and 8-2 and outputs the sum.

(b) Structure of Desired-signal/Noise-signal Detector

Figure 5:
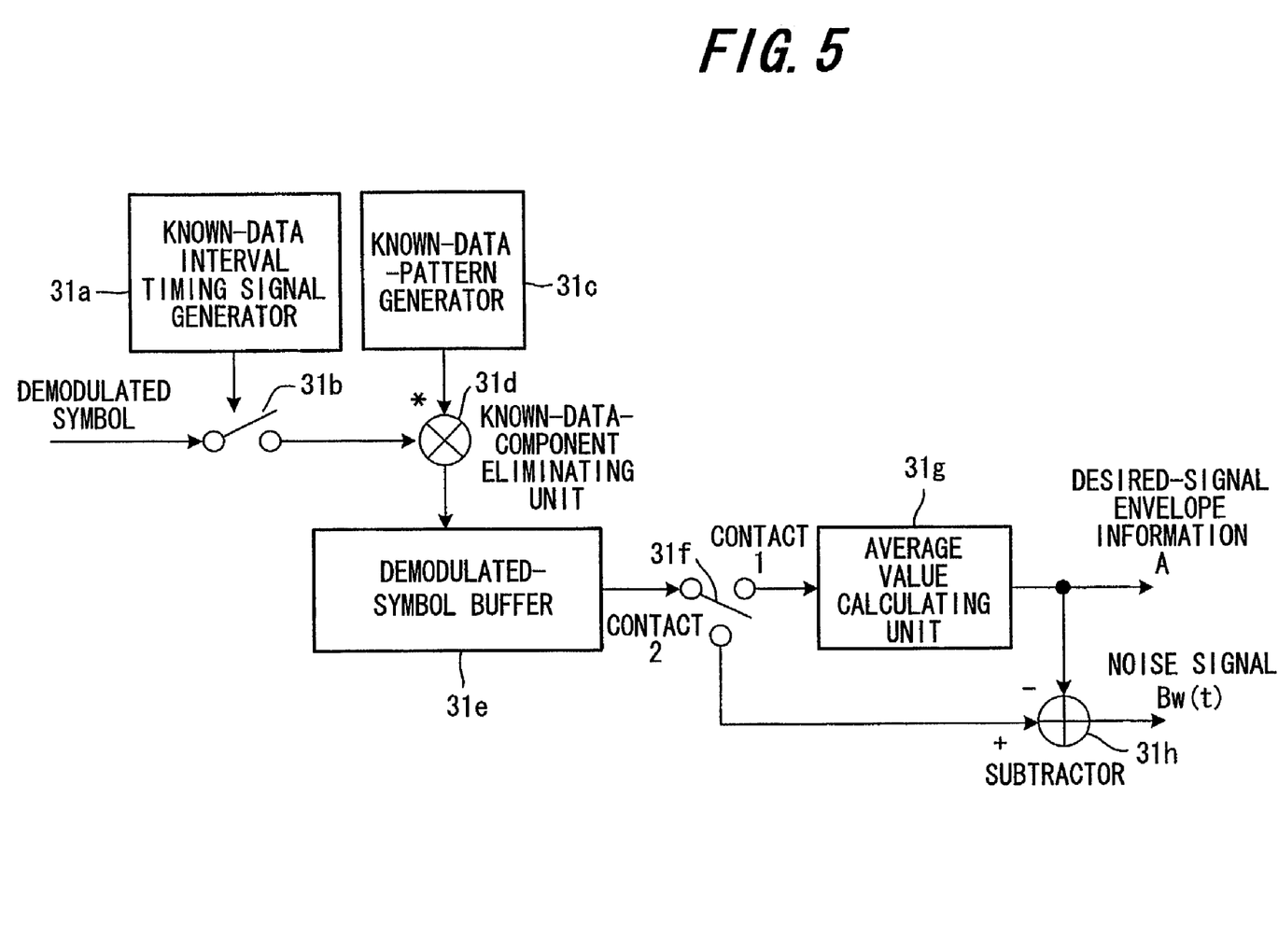
FIG. 5 is a block diagram of a desired signal/noise signal detector.

FIG. 5 is a block diagram of the desired-signal/noise-signal detector 3-1.

A known-data interval timing signal generator 31a turns on a switch 31b during the known-data interval of a demodulated signal output from the demodulator 2-1. The timing of the known-data interval can be readily obtained taking into consideration the phase of a receive spreading code being detected in a spreading code synchronizing unit (not shown) and the predetermined signal format illustrated in FIG. 3.

A known-data-pattern generator 31c generates and outputs known data (one example of which is a complex constant in which the real part is "1" and the imaginary part is "1") in a predetermined known-data interval. A known-data-component eliminating unit 31d eliminates a known data component from demodulated symbols in the known-data interval. More specifically, the known-data-component eliminating unit 31d eliminates the known data component from the demodulated symbols by multiplying the demodulated symbols by the complex conjugate value of the known data.

After the known data component is eliminated, the demodulated symbols are stored in a demodulated-symbol buffer 31e in accordance with the time at which the symbols were received. If I represents the number of symbols in the interval of the known data, the demodulated-symbol buffer will be for I-number of symbols.

A switch 31f initially is connected to a contact 1. An average value calculating unit 31g calculates the average value of I symbol's worth of demodulated symbols stored in the demodulated-symbol buffer 31e and outputs the result of calculation as envelope information (amplitude information) of the desired signal.

Following the averaging calculation performed by the average value calculating unit 31g, the switch 31f is connected to a contact 2 and a subtractor 31h subtracts the above-mentioned envelope information of the desired signal from each of the I symbol's worth of demodulated symbols, which have been stored in the demodulated-symbol buffer 31e, in accordance with the time at which the symbols were received and outputs the result as a noise signal.

In general, a branch signal R(t) is represented by the following equation:

$$R(t)=As(t)+Bw(t)$$

where s(t) represents a desired signal and w(t) represents noise on the branch. It is assumed that $Ex[s(t)^2]=Ex[w(t)^2]=1$ (where Ex[ ] represents the expected value in the observed interval). Further, A, B represent the amplitudes of the desired signal and noise, respectively, on the branch.

The envelope information of the desired signal and the noise signals obtained by the desired-signal/noise-signal detector 3-1 correspond to A and Bw(t), respectively, in the above equation.

(D) Operation of Receiving Apparatus of the Invention

The demodulator 2-1 subjects the receive signal of branch 1 to demodulation processing that corresponds to modulation processing performed on the transmitter side. For example, if spread-spectrum modulation is being carried out on the transmitter side, then the demodulator 2-1 executes despread processing and outputs the demodulated symbols at the symbol speed.

The desired-signal/noise-signal detector 3-1 executes the processing described in connection with FIG. 5 and outputs the envelope information A of the desired signal and the noise signal Bw(t).

The noise average power detector 4-1 calculates the average power of the noise signals, which enter from the desired-signal/noise-signal detector 3-1, in the known-data interval and outputs the result.

The demodulator 2-2, desired-signal/noise-signal detector 3-2 and noise average power detector 4-2 subject the receive signal of branch 2 to processing similar to that executed by the demodulator 2-1, desired-signal/noise-signal detector 3-1 and noise average power detector 4-1.

On the basis of noise signals $n_1(1), n_1(2), \ldots, n_1(i), \ldots n_1(I)$ in the known-data interval output by the desired-signal/noise-signal detector 3-1 and the noise signals $n_2(1), n_2(2), \ldots, n_2(i), \ldots n_2(I)$ in the known-data interval output by the desired-signal/noise-signal detector 3-2, the noise correlation detector 5 calculates and outputs correlations Corr_I, Corr_Q of noise on branch 1 and noise on branch 2 in accordance with the following equations:

$$Corr\_I = Ex_{i=1',I}[x_1(i)x_2(i)+y_1(i)y_2(i)] \quad (36)$$

$$Corr\_Q = Ex_{i=1',I}[x_2(i)y_1(i)-x_1(i)y_2(i)] \quad (37)$$

where I represents the number of symbols in a single known-data interval. Further, $Ex_{i=1',I}[\ ]$ represents calculation of the average value from i=1 to i=I. In addition, the following hold:

$$n_1(i)=x_1(i)+jy_1(i) \quad (38)$$

$$n_2(i)=x_2(i)+jy_2(i) \quad (39)$$

Let A(m) represent the envelope information of the desired signal in an mth known-data interval (denoted by "time m" below), P(m) the average power of noise, and Corr_I(m), Corr_Q(m) the noise correlations. Envelope information $A_1(m)$ of the desired signal output from the desired-signal/noise-signal detector 3-1, envelope information $A_2(m)$ of the desired signal output from the desired-signal/noise-signal detector 3-2, noise average power $P_1(m)$, which is the output of the noise average power detector 4-1, noise average power $P_2(m)$, which is the output of the noise average power detector 4-2, and the noise correlations Corr_I(m), Corr_Q(m) between the branches 1 and 2 output from the noise correlation detector 5 are input to the weighting-coefficient calculating unit 6, which calculates the weighting coefficients $G_1$, $G_2$ of the receive signals on branches 1, 2, respectively, by executing the processing ① to ⑥ below.

① Processing for Weighted Moving Average of Desired-signal Envelope Information

The following processing for obtaining the weighted moving average is executed with regard to $A_1(t)$, $A_2(t)$ at times t=m, m−1, ..., m−(MW−1):

$$A_1'=Ex_{i=0,(MA-1)}[\alpha_i A_1(m-i)] \quad (40)$$

$$A_2'=Ex_{i=0,(MA-1)}[\alpha_i A_2(m-i)] \quad (41)$$

Here a weighted average length MA and weight value $\alpha_i$ are predetermined values.

② Processing for Weighted Moving Average of Noise Average Power and Noise Correlation The following processing for obtaining the weighted moving average is executed with regard to $P_1(m)$, $P_2(m)$, Corr_I(m), Corr_Q(m) at times t=m, m−1, ..., m−(MW−1):

$$P_1'=Ex_{i=0,(MW-1)}[\beta_i P_1(m-i)] \quad (42)$$

$$P_2'=Ex_{i=0,(MW-1)}[\beta_i P_2(m-i)] \quad (43)$$

$$Corr\_I'=Ex_{i=0,(MW-1)}[\beta_i Corr\_I(m-i)] \quad (44)$$

$$Corr\_Q'=Ex_{i=0,(MW-1)}[\beta_i Corr\_Q(m-i)] \quad (45)$$

Here a weighted average length MW and weight value $\beta_i$ are predetermined values.

③ Phase Rotation Correction of Noise Correlation

Noise correlation Corr after correction of phase rotation is calculated in accordance with the following equation taking Equation (35) into consideration:

$$Corr = Corr\_I' \cos(\theta_1-\theta_2) + Corr\_Q' \sin(\theta_1-\theta_2) \quad (46)$$

where $\theta_1$, $\theta_2$ represent the rotational phases of $A_1'$, $A_2'$, respectively, ascribable to the propagation path characteristic.

④ Calculation of Weighting Coefficients

The weighting coefficients $G_1$, $G_2$ of branches 1, 2, respectively, are calculated in accordance with the following equations taking Equations (13), (14) into consideration:

$$G_1=|A_1'|\{P_1'-(|A_1'|/|A_2'|)Corr\} \quad (47)$$

$$G_2=|A_2'|\{P_2'-(|A_2'|/|A_1'|)Corr\} \quad (48)$$

⑤ Discrimination of Sign of Weighting Coefficients

Next, the calculation $G_1|A_1'|+G_2|A_2'|$ is performed. If the sign is positive, the final weighting coefficients $G_1'$, $G_2'$ are made as follows:

$$G_1'=G_1 \quad (49)$$

$$G_2'=G_2 \quad (50)$$

If the sign is negative, the final weighting coefficients $G_1'$, $G_2'$ are made as follows:

$$G_1'=-G_1 \quad (51)$$

$$G_2'=-G_2 \quad (52)$$

⑥ Application of Phase-correction Vector to Weighting Coefficient

It is necessary that the phases of the receive signals on branches 1, 2 be made to match before the signals are combined by the combiner 9. It is therefore necessary to multiply the receive signals by the weighting coefficients using the multipliers 8-1, 8-2 and to subject the products to $-\theta_1$, $-\theta_2$ rotation processing. Accordingly, in the present invention, the weighting-coefficient calculating unit 6 multiplies the weighting coefficients $G_1'$, $G_2'$ obtained in ⑤ above by $e^{-j\theta_1}$, $e^{-j\theta_2}$, respectively, and inputs the products to the multipliers 8-1, 8-2, respectively, whereby processing for rotation by $-\theta_1$, $-\theta_2$ is applied to the product outputs of the multipliers 8-1, 8-2, respectively. That is, the weighting-coefficient calculating unit 6 finds $G_1''$, $G_2''$ in accordance with the following equations:

$$G_1''=e^{-j\theta_1}G_1' \quad (53)$$

$$G_2''=e^{-j\theta_2}G_2' \quad (54)$$

and inputs $G_1''$, $G_2''$ to the multipliers 8-1, 8-2, respectively. Here $\theta_1$, $\theta_2$ represent the phases of $A_1'$, $A_2'$ ascribable to the propagation path characteristics. Further, $e^{j\theta}$ is the complex number of amplitude 1 and phase θ, and $e^{-j\theta_1}$, $e^{-j\theta_2}$ are correction vectors for correcting phase rotation of the demodulated symbols on branches 1, 2.

The buffers 7-1, 7-2 output the demodulated symbols of branches 1, 2, which are input thereto, upon delaying them by a length of time equivalent to the delay time from the desired-signal/noise-signal detector 3-1 to the weighting-coefficient calculating unit 6.

The multiplier 8-1 multiplies the output of the buffer 7-1 by $G_1''$, which is the output of the weighting-coefficient calculating unit 6, and the multiplier 8-2 multiplies the output of the buffer 7-2 by $G_2''$, which is the output of the weighting-coefficient calculating unit 6. The combiner 9 adds and outputs the result of multiplication by the multiplier 8-1 and the result of multiplication by the multiplier 8-2. The combiner 9 outputs demodulated symbols obtained as a result of diversity combining.

Figure 6:
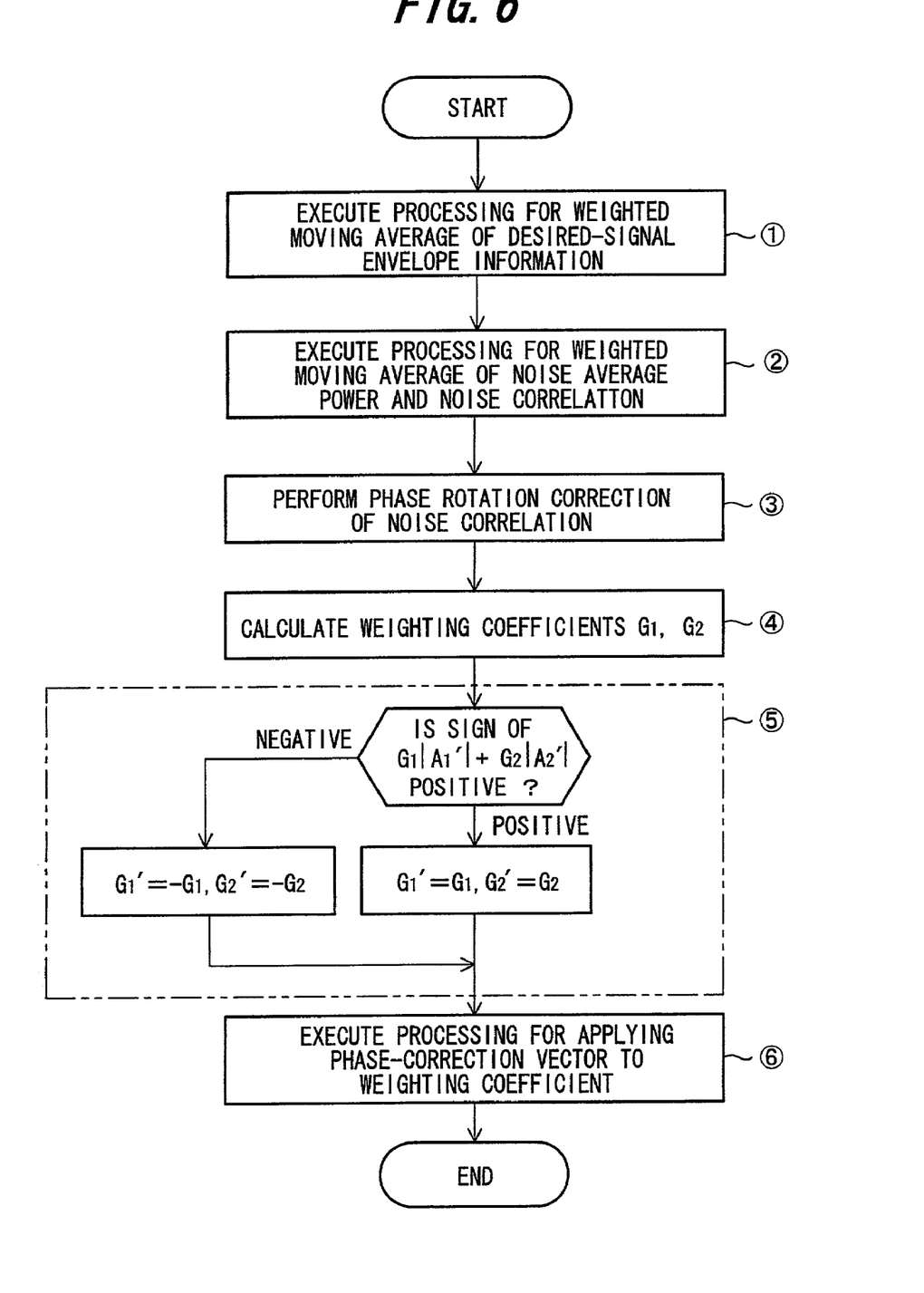
FIG. 6 is a flowchart of processing for calculating weighting coefficients.

FIG. 6 is a flowchart of the above-described processing for calculating weighting coefficients. The same step numbers ① to ⑥ are assigned to steps that correspond to the processing of ① to ⑥ above.

(E) Other Processing for Calculating Weighting Coefficients

The above-described weighting-coefficient calculation processing ④ includes finding the $K=K^{(op)}$ for which $d\gamma/dK=0$ holds, deriving the calculation formulae for the weighting coefficients $G_1$, $G_2$ using $K^{(op)}$, and calculating the weighting coefficients $G_1$, $G_2$ in accordance with Equations (47), (48) using these calculation formulae. However, instead of calculating the weighting coefficients as set forth in ④ above, it is possible to find the weighting coefficients $G_1$, $G_2$ of branches 1, 2, respectively, by the following processing: repeating processing for calculating the signal-to-noise power ratio γ in accordance with Equation (55) below while changing the value of K, and finding the value of K for which γ is maximized.

$$\gamma=(1+K)^2/(M_1^2+K^2M_2^2+2KM_1M_2N_{12}) \quad (55)$$

where $$M_1=B_1/|A_1'| \quad (56)$$

$$M_2=B_2/|A_2'| \quad (57)$$

$$B_1B_2N_{12}=Corr \quad (58)$$

$$B_1^2=P_1' \quad (59)$$

$$B_2^2=P_2' \quad (60)$$

If the value of K for which γ is maximized has been found, then the weighting coefficients $G_1$, $G_2$ are obtained in accordance with the following equations:

$$G_1=1/|A_1'| \quad (61)$$

$$G_2=K/|A_2'| \quad (62)$$

where | | indicates calculation of the absolute value.

Figure 7:
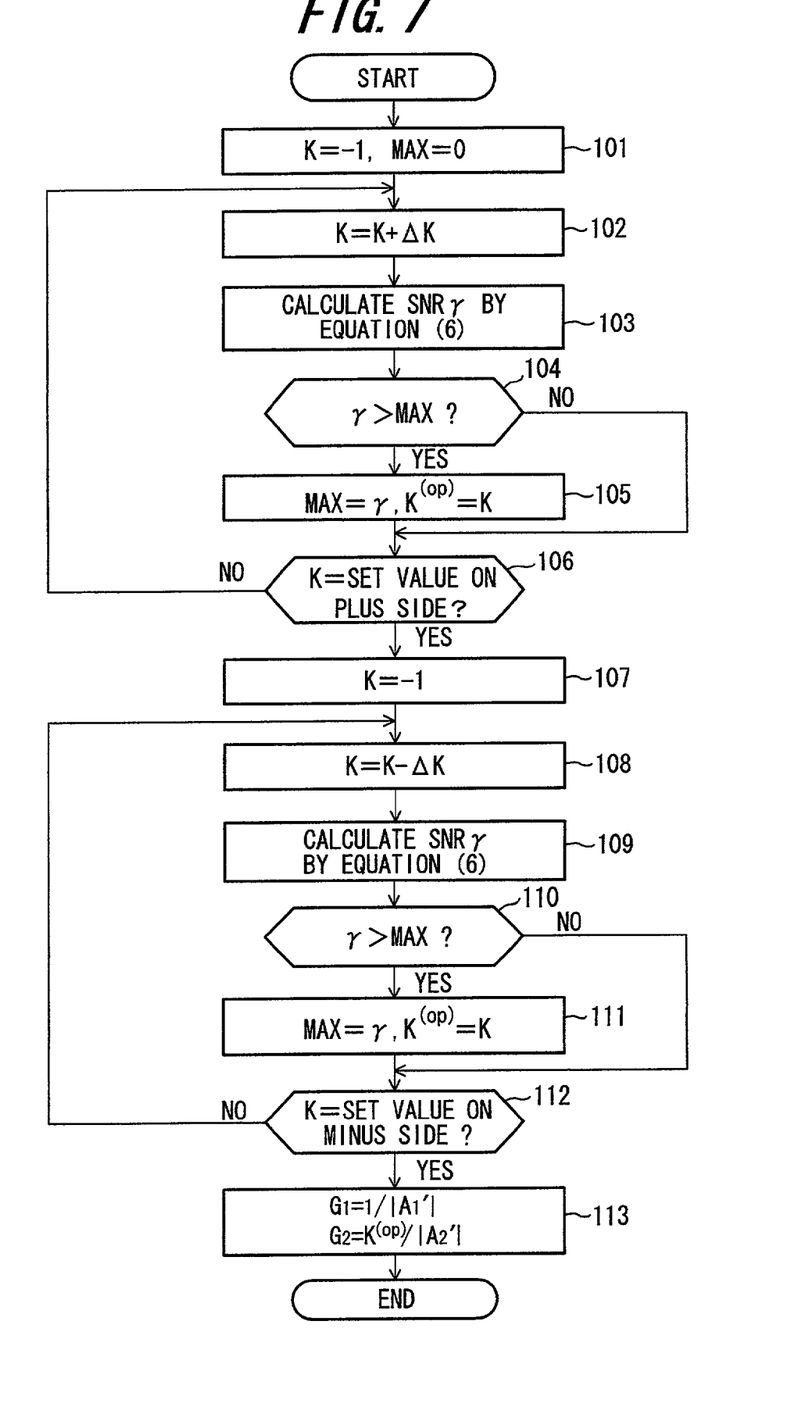
FIG. 7 is another flowchart of processing for calculating a value of K for which γ is maximized.

A specific method of finding the value of K for which γ is maximized will be described in accordance with the processing flow of FIG. 7.

The SNR γ can be expressed by Equation (6), namely $$\gamma=(1+K)^2/(M_1^2+K^2M_2^2+2KM_1M_2N_{12}) \quad (6)$$

It should be obvious from Equation (6) that SNR γ will be zero at K=−1. Hence, γ=0 at K=−1 is used as the initial value. Accordingly, initialization to K=−1, maximum value MAX=0 is performed at step 101.

Next, K is incremented by a predetermined minute amount of change ΔK and SNR γ is calculated in accordance with Equation (6) (steps 102, 103).

When SNR γ has been calculated, the maximum value MAX and SNR γ are compared (step 104). If SNR γ is greater, then MAX is replaced by γ and the value of K at this time retained as $K^{(op)}$ (MAX=γ; step 105).

It is then determined whether K has reached a set value on the plus side (step 106) and the processing of steps 102 to 105 is repeated until K attains the set value on the plus side.

If K attains the set value on the plus side, K is initialized to −1 (step 107), after which K is decremented by the predetermined minute amount of change ΔK and SNR γ is calculated in accordance with Equation (6) (steps 108, 109).

When SNR γ has been calculated, the maximum value MAX and SNR γ are compared (step 110). If SNR γ is greater, then MAX is replaced by γ and the value of K at this time retained as $K^{(op)}$ (MAX=γ; step 111).

It is then determined whether K has reached a set value on the minus side (step 112) and the processing of steps 108 to 111 is repeated until K attains the set value on the minus side.

If K attains the set value on the minus side, $K^{(op)}$ that was retained when the maximum value MAX was obtained is adopted as the weighting coefficient for which the signal-to-noise power ratio is maximized. The weighting coefficients $G_1$, $G_2$ on the branches 1,2 are then calculated in accordance with the following equations (step 113):

$$G_1=1/|A_1'| \quad (63)$$

$$G_2=K^{(op)}/|A_2'| \quad (64)$$

Basically, $K^{(op)}$ can be found through the procedure described above. However, the amount of processing/calculation can be reduced by following the following procedure:

It can readily be imagined that the K that maximizes the SNR γ of Equation (6) will always exist among values greater than K=−1 on the condition that $M_2 \geq M_1$ holds. For example, if $N_{12}=1$ holds in Equation (8), then the following equation will hold for K:

$$K=M_1(M_1-M_2)/M_2(M_2-M_1)=-(M_1/M_2)$$

If $M_2 \geq M_1$ holds, therefore, then $$K=-(M_1/M_2) \geq -1$$

will hold. In this environment, therefore, it is possible to eliminate steps 107 to 112. Processing can be abbreviated in similar fashion if $M_2 \leq M_1$ holds.

(F) Results of Simulation

Figure 8:
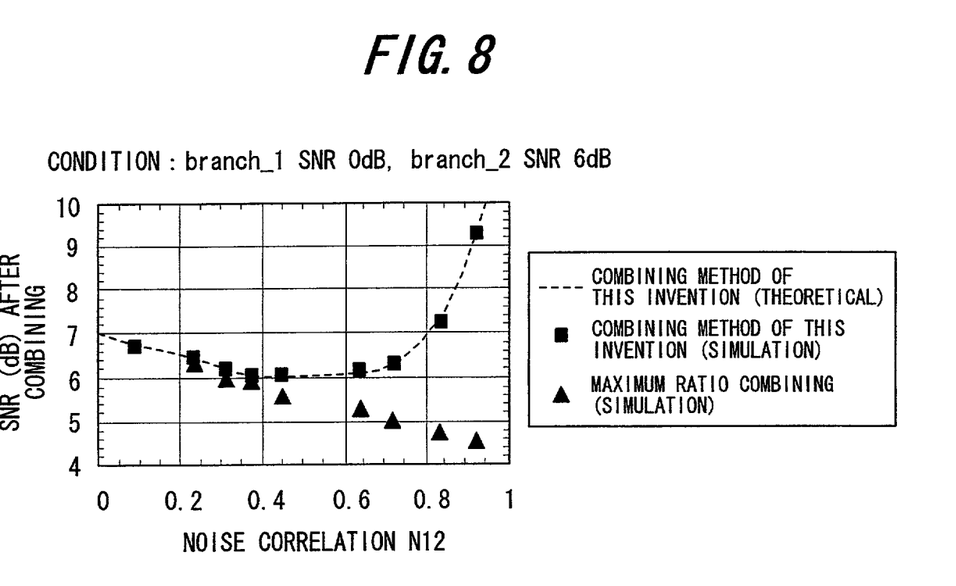
FIG. 8 shows the results of a simulation for describing the effects of the present invention.

The effects of the present invention will now be described in accordance with the results of a simulation. The simulation conditions SNR=0 dB on branch 1 and SNR=6 dB on branch 2. The results of the simulation are shown in FIG. 8. The "theoretical" values in FIG. 8 are based upon Equation (9). In FIG. 8, $N_{12}$ along the horizontal axis is a parameter indicating the correlation between noise components contained in branches 1 and 2; the closer $N_{12}$ is to 1, the greater the correlation. The vertical axis indicates the SNR after signals are combined. FIG. 8 demonstrates that the diversity combining method of the present invention improves SNR even when noise correlation increases. More specifically, SNR does not fall below the SNR (=6 dB) of whichever of the branch signals prior to combining has the higher quality. By contrast, with the maximum ratio combining method of the prior art, the greater the noise correlation, the smaller the SNR of the combined signal; rather than improving, the characteristic deteriorates owing to the combining of the signals. In other words, SNR falls below the SNR (=6 dB) of whichever of the branch signals prior to combining has the higher quality.

Diversity combining and receiving of two branch signals has been illustrated in the foregoing embodiment. However, the present invention naturally is applicable to the diversity combining and receiving of signals on three or more branches. Further, this embodiment illustrates the case of a mobile communications system in which known data of a predetermined duration is transmitted upon being inserted at predetermined time intervals between items of transmitted information data on the transmitting side. However, the present invention naturally is applicable in the case of other systems as well. Further, in operation according to the above embodiment, a case is illustrated in which processing is executed in the form of complex signals. However, the form of signal expression is not limited to this arrangement.

Figure 9:
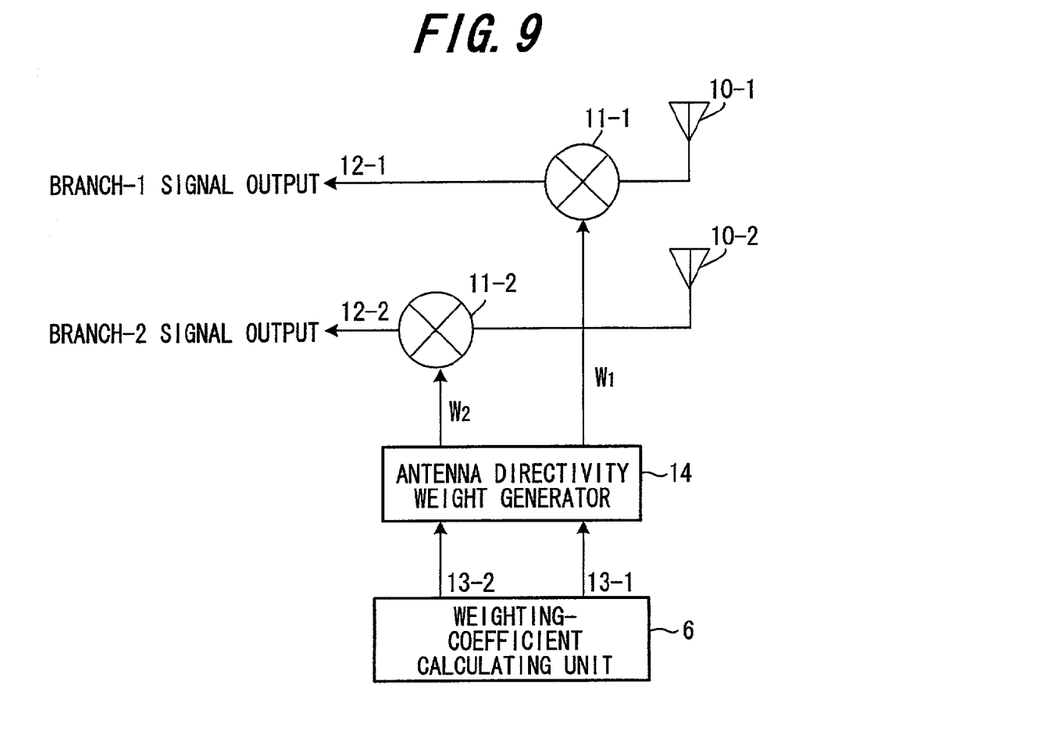
FIG. 9 is a diagram useful in describing an example in which the present invention is applied to beam control of a directional antenna.

(G) Example of Application of Present Invention (a) Example of Application to Beam Control of Directional Antenna FIG. 9 is a diagram useful in describing an example of application in which the present invention is applied to beam control of a directional antenna. Illustrated in FIG. 9 are the weighting-coefficient calculating unit 6, directional antennas 10-1, 10-2, directivity controllers 11-1, 11-2, branch signal output terminals 12-1, 12-2, parameter input terminals 13-1, 13-2 and an antenna directivity weight generator 14. The weighting-coefficient calculating unit 6 is a component that is the same as the weighting-coefficient calculating unit of FIG. 4.

In this arrangement, the antenna directivity weight generator 14 uses parameters 13-1, 13-2, which enter from the weighting-coefficient calculating unit 6, to calculate antenna directivity weights $W_1$, $W_2$ so as to raise the diversity gain of the receiving apparatus connected downstream, and outputs the weights $W_1$, $W_2$ to the directivity controllers 11-1, 11-2, respectively. The directivity controllers 11-1, 11-2 control the directional antennas 10-1, 10-2 mechanically or electrically based upon the antenna directivity weights $W_1$, $W_2$ indicated by the antenna directivity weight generator 14 and output the respective receive signals from the signal output terminal 12-1 of branch 1 and the signal output terminal 12-2 of branch 2. By adopting this arrangement, it is possible to raise the diversity gain of the receiving apparatus connected downstream.

Though the foregoing description relates to a receiving antenna, the information can be used also as information for deciding the antenna directivity weights of a transmitting antenna.

(b) Example of Application to Path Selection Control in Path Searcher

Figure 10:
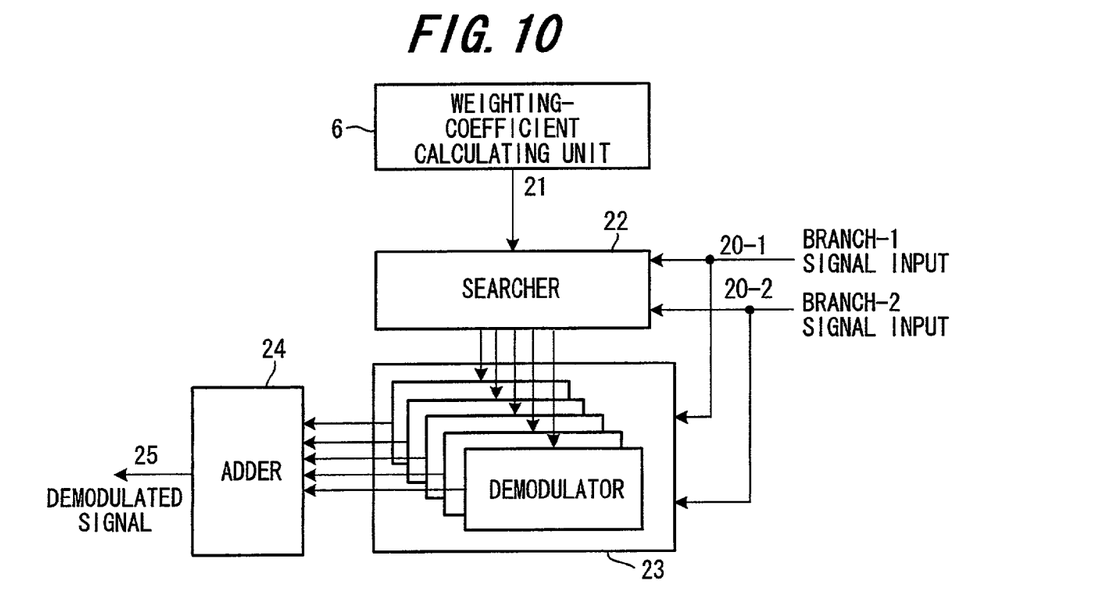
FIG. 10 is a diagram useful in describing an example in which the present invention is applied to path selection control in a path searcher.

FIG. 10 is a diagram useful in describing an example in which the present invention is applied to path selection control in a path searcher. A receiving apparatus that employs spread-spectrum communication includes a searcher 22, a demodulator 23 constituted by a number of fingers, and an adder 24 referred to as a combiner. The searcher 22 detects path phases of multipath channels by applying despread processing using a predetermined spreading code to receive signals on branches 1 and 2. If it were a prior-art searcher, the searcher 22 would assign to fingers those paths having high power values from among the number of path phases obtained as the result of despread processing, and the outputs of these fingers would undergo RAKE combining in the combiner 24. However, according to the present invention, the searcher 22 decides path phase based upon parameter values that enter from the weighting-coefficient calculating unit 6 and the results of despread processing in such a manner that the requisite diversity gain is obtained, thereby making it possible to select path phase efficiently. In other words, the searcher 22 takes into consideration the weighting coefficients between the branches, which signals are output from the weighting-coefficient calculating unit 6, to make the determination as to which paths should be assigned to the fingers.

Thus, in accordance with the present invention as described above, the cross-correlation between noise components contained in receive signals on respective ones of receiving branches is taken into account to decide the weighting coefficients of the receive signals on the respective branches in such a manner that SNR after the signals are combined will be maximized. As a result, even if the correlation between noise components contained in the receive signals is large, the characteristics will always be improved by combining signals or, in the worst case, the SNR of high quality can be maintained. This means that the SNR will not fall below the SNR of whichever of the branch signals prior to combining has the high quality.

As many apparently widely different embodiments of the present invention can be made without departing from the spirit and scope thereof, it is to be understood that the invention is not limited to the specific embodiments thereof except as defined in the appended claims.

What is claimed is:

1. A receiving method in a mobile communications receiving apparatus, comprising the steps of:
   expressing signal-to-noise power ratio by an equation using a prescribed parameter;
   calculating an optimum parameter value for which an amount of change in the signal-to-noise power ratio with respect to a minute change in the parameter will be zero; and
   controlling reception using the optimum parameter value.

2. A receiving method in a mobile communications receiving apparatus for combining and receiving signals that have been received on a plurality of receiving paths, comprising the steps of:
   expressing a signal-to-noise power ratio of the combined signal by an equation using a weighting coefficient;
   calculating an optimum weighting coefficient value for which an amount of change in the signal-to-noise power ratio with respect to a minute change in the weighting coefficient will be zero; and
   combining the receive signals upon applying the optimum weighting coefficient value to the receive signals.

3. A receiving method in a mobile communications receiving apparatus, comprising the steps of:
   expressing signal-to-noise power ratio by an equation using a prescribed parameter;
   repeating processing for calculating signal-to-noise power ratio while changing he value of the parameter, and calculating an optimum parameter value for which the signal-to-noise power ratio is maximized; and
   controlling reception using the optimum parameter value so as to maximize the signal-to-noise power ratio.

4. A receiving method in a mobile communications receiving apparatus for combining anti receiving signals that have been received on a plurality of receiving paths, comprising the steps of:
   expressing a signal-to-noise power ratio of the combined signal by an equation using a weighting coefficient;

repeating processing for calculating signal-to-noise power ratio while changing the value of the weighting coefficient, and calculating an optimum weighting coefficient for which the signal-to-noise power ratio is maximized; and combining the receive signals upon applying the optimum weighting coefficient value to the receive signals.

5. A mobile communications receiving apparatus for combining and receiving signals that have been received on a plurality of receiving pats, comprising:

an optimum weighting coefficient calculating unit for expressing a signal-to-noise power ratio of the combined signal by an equation using a weighting coefficient applied to a receive signal, and calculating an optimum weighting coefficient value for which an amount of change in the signal-to-noise power ratio with respect to a minute change in the weighting coefficient will be zero; and a weighting coefficient applying unit for controlling the signal-to-noise power ratio of the combined signal by applying the optimum weighting coefficient to the receive signal.

6. A mobile communications receiving apparatus for combining and receiving signals that have been received on a plurality of receiving paths, comprising:

an optimum weighting coefficient calculating unit for expressing a signal-to-noise power ratio of the combined signal by an equation using a weighting coefficient applied to a receive signal, repeating processing for calculating signal-to-noise power ratio while changing the value of the weighting coefficient, and calculating an optimum weighting coefficient for which the signal-to-noise power ratio is maximized; and a weighting coefficient applying unit for controlling the signal-to-noise power ratio of the combined signal by applying the optimum weighting coefficient to the receive signal.

7. A mobile communications receiving apparatus for combining and receiving signals that have been received on a plurality of receiving paths, comprising:

desired signal detecting means, provided in association with respective ones of a plurality of receive signals received on a plurality of receiving paths, for detecting amplitude information of desired signals contained in respective ones of the receive signals;

noise signal detecting means, provided in association with respective ones of the receive signals, for detecting noise signals contained in respective ones of the receive signals;

noise average power detecting means, provided in association with respective ones of the receive signals, for detecting average power of the noise signals detected by said noise signal detecting means;

noise correlation detecting means for detecting cross-correlation of the noise signals with regard to all combinations of the plurality of noise signals detected by said plurality of noise signal detecting means;

weighting-coefficient calculating means for calculating optimum weighting coefficient values, for which an amount of change in the signal-to-noise power ratio with respect to a minute change in the weighting coefficients will be zero, based upon the amplitude information of the desired signals detected by respective ones of said desired signal detecting means, the noise avenge power detected by respective ones of said noise average power detecting means and the noise-signal cross-correlation detected by said noise correlation detecting means;

weighting means for multiplying the receive signals by corresponding ones of the optimum weighting coefficients calculated by said weighting-coefficient calculating means; and combining means for adding outputs from all of said weighting means.

8. A mobile communications receiving apparatus for combining and receiving signals that have been received on a plurality of receiving paths, comprising:

desired signal detecting means, provided in association with respective ones of a plurality of receive signals received on a plurality of receiving paths, for detecting amplitude information of desired signals contained in respective ones of the receive signals;

noise signal detecting means, provided in association with respective ones of the receive signals, for detecting noise signals contained in respective ones of the receive signals;

noise average power detecting means, provided in association with respective ones of the receive signals, for detecting average power of the noise signals detected by said noise signal detecting means;

noise correlation detecting means for detecting cross-correlation of the noise signals with regard to all combinations of the plurality of noise signals detected by said plurality of noise signal detecting means;

weighting coefficient calculating means, for calculating weighting coefficients for which the signal-to-noise power ratio is maximized, based upon the amplitude information of the desired signals detected by respective ones of said desired signal detecting means, the noise average power detected by respective ones of said noise average power detecting means and the noise-signal cross-correlation detected by said noise correlation detecting means;

weighting means for multiplying the receive signals by corresponding ones of the weighting coefficients calculated by said weighting-coefficient calculating means; and combining means for adding outputs from all of the weighting means.

9. The apparatus according to claim 8, wherein said weighting coefficient calculating means repeats processing for calculating signal-to-noise power ratio while changing the value of the weighting coefficient, and obtains an optimum weighting coefficient for which the signal-to-noise power ratio is maximized.

10. A mobile communications receiving apparatus for combining and receiving signals that have been received on a plurality of receiving pats, comprising:

desired signal detecting means, provided in association with respective ones of a plurality of receive signals received on a plurality of receiving paths, for detecting amplitude information of desired signals contained in respective ones of the receive signals;

noise signal detecting means, provided in association with respective ones of the receive signals, for detecting noise signals contained in respective ones of the receive signals;

noise average power detecting means, provided in association with respective ones of the receive signals, for detecting average power of the noise signals detected by said noise signal detecting means;

noise correlation detecting means for detecting cross-correlation of the noise signals with regard to all combinations of the plurality of noise signals detected by said plurality of noise signal detecting means;

weighting coefficient calculating means for calculating weighting coefficients based upon the amplitude information of the desired signals detected by respective ones of said desired signal detecting means, to noise average power detected by respective ones of said noise average power detecting means and the noise-signal cross-correlation detected by said noise correlation detecting means;

weighting means for multiplying the receive signals by corresponding ones of the weighting coefficients calculated by said weighting-coefficient calculating means; and combining means for adding outputs front all of the weighting means;

wherein said noise correlation detecting means calculates cross-correlation between a noise signal of at prescribed receiving path 1 and a noise signal of another receiving path 2 by (1) adding the product of Y1 and Y2 to the product of X1 and X2 and obtaining an expected value of the sum, (2) multiplying the expected value by the cosine value of the difference between a desired-signal phase of the receiving path 2 and a desired-signal phase of the receiving path 1, (3) subtracting the product of X1 and Y2 from the product of X2 and Y1 and obtaining an expected value of the difference, (4) multiplying the expected value by the sine value of the difference between the desired-signal phase of the receiving path 2 and the desired-signal phase of the receiving path 1, and (5) summing the products, where X1 represents an in-phase component of noise of the receiving path 1, X2 an in-phase component of noise of the receiving path 2, Y1 a quadrature component of noise of the receiving path 1 and Y2 a quadrature component of noise of the receiving path 2; and if there have been found a plurality of sets of weighting coefficients of each of the receiving paths for which an amount of change in signal-to-noise power ratio with respect to a minute change in the weighting coefficients becomes zero, then, when the desired signal amplitudes of the respective receiving paths have been added upon being weighted by the corresponding weighting coefficients set by set, said weighting coefficient calculating means outputs a set of the weighting coefficients for which the sum will be a positive value.

11. A mobile communications receiving apparatus for combining and receiving signals that have been received on a plurality of receiving paths in a mobile communications system in which known data of a predetermined duration is transmitted upon being inserted at predetermined time intervals between items of transmitted information data on a transmitting side, said apparatus comprising:

desired signal detecting means, provided in association with respective ones of a plurality of receive signals received on a plurality of receiving paths, for detecting, as amplitude information of desired signals, average values of the receive signals in known-data intervals from which known data components have been eliminated;

noise signal detecting means, provided in association with respective ones of the receive signals, for detecting, as noise signals, signals obtained by subtracting the amplitude values of the desired signals of corresponding times from respective ones of the receive signals in the known-data intervals from which data components have been eliminated;

noise average power detecting means, provided in association with respective ones of the receive signals, for detecting average power of the noise signals in the known-data intervals detected by said noise signal detecting means;

noise correlation detecting means for detecting cross-correlation of the noise signals in the known-data intervals with regard to all combinations of the plurality of noise signals detected by said plurality of noise signal detecting means;

weighting coefficient calculating means for calculating weighting coefficient values based upon the amplitude information of the desired signals in the known-data intervals detected by respective ones of said desired signal detecting means, the noise average power in the known-data intervals detected by respective ones of said noise average power detecting means and the noise-signal cross-correlation in the known-data intervals detected by said noise correlation detecting means;

weighting means for multiplying the receive signals by corresponding ones of the weighting coefficients calculated by said weighting-coefficient calculating means; and combining means for adding outputs from all of said weighting means;

wherein said noise correlation detecting means calculates cross-correlation between a noise signal of a prescribed receiving path 1 and a noise signal of another receiving path 2 by (1) adding the product of Y1 and Y2 to the product of X1 and X2 and obtaining an expected value of the sum, (2) multiplying the expected value by the cosine value of the difference between a desired-signal phase of the receiving path 2 and a desired-signal phase of the receiving path 1, (3) subtracting the product of X1 and Y2 from the product of X2 and Y1 and obtaining an expected value of the difference, (4) multiplying the expected value by the sine value of the difference between the desired-signal phase of the receiving path 2 and the desired-signal phase of the receiving path 1, and (5) summing the products, where X1 represents an in-phase component of noise of the receiving path 1, X2 an in-phase component of noise of the receiving path 2, Y1 a quadrature component of noise of the receiving path 1 and Y2 a quadrature component of noise of the receiving path 2; and if there have been found a plurality of sets of weighting coefficients of each of the receiving paths for which an amount of change in signal-to-noise power ratio with respect to a minute change in the weighting coefficients becomes zero, then, when the desired signal amplitudes of the respective receiving paths have been added upon being weighted by the corresponding weighting coefficients set by set, said weighting coefficient calculating means outputs a set of the weighting coefficients for which the sum will be a positive value.

* * * * *